(12) United States Patent  
Saiger et al.

(10) Patent No.: US 10,997,793 B1  
(45) Date of Patent: *May 4, 2021

(54) AUGMENTED REALITY PRESENTATION USING A UNIFORM RESOURCE IDENTIFIER

(71) Applicant: VERTEBRAE INC., Los Angeles, CA (US)

(72) Inventors: Micah Saiger, Los Angeles, CA (US); Tyler John Lindberg, Santa Monica, CA (US); Blaise Thomas, Santa Monica, CA (US); Keith Cody Rives, Marina del Rey, CA (US); Garrett Eastham, Austin, TX (US); Vincent Thomas Cacace, West Hollywood, CA (US)

(73) Assignee: Vertebrae Inc., Los Angeles, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/015,660

(22) Filed: Sep. 9, 2020

Related U.S. Application Data

(63) Continuation of application No. 16/752,566, filed on Jan. 24, 2020, now Pat. No. 10,777,017.

(51) Int. Cl.
 *G06T 19/00* (2011.01)
 *G06F 16/955* (2019.01)
 *G06F 16/958* (2019.01)

(52) U.S. Cl.
 CPC .......... *G06T 19/006* (2013.01); *G06F 16/955* (2019.01); *G06F 16/958* (2019.01)

(58) Field of Classification Search
 CPC ............................ G06T 19/006; G06F 16/955  
 See application file for complete search history.

(56) References Cited

U.S. PATENT DOCUMENTS

| | | |
|---|---|---|
| 6,208,347 B1 | 3/2001 | Migdal et al. |
| 7,742,061 B2 | 6/2010 | Chen |
| 8,060,414 B1 | 11/2011 | Lin et al. |

(Continued)

OTHER PUBLICATIONS

Allan, "How to create a QR code that deep links to your mobile app," Pure Oxygen Labs, retrieved from URL <https://pureoxygenlabs.com/how-to-create-a-qr-codes-that-deep-link-to-your-mobile-app/>, 2017, 9 pages.

(Continued)

*Primary Examiner* — Phong X Nguyen  
(74) *Attorney, Agent, or Firm* — Fish & Richardson P.C.

(57) ABSTRACT

Methods, systems, and apparatus, including computer programs encoded on computer storage media, for presenting an augmented reality presentation. One of the methods includes receiving data for a web page associated with a uniform resource indicator and including data for augmented reality presentations. An augmented reality presentation is selected for the web page, and automatically presented using the data for the augmented reality presentation, and data from a camera included in a mobile device. After automatically presenting the augmented reality presentation, data is received indicating that the augmented reality presentation should end. After receiving the data indicating that the augmented reality presentation should end, the web page is presented.

20 Claims, 5 Drawing Sheets

(56) References Cited

U.S. PATENT DOCUMENTS

| | | | |
|---|---|---|---|
| 8,898,272 B1 | 11/2014 | Young et al. | |
| 8,966,356 B1* | 2/2015 | Hickman | G06T 15/20 |
| | | | 715/208 |
| 9,250,765 B2 | 2/2016 | Nicolaou et al. | |
| 9,356,821 B1* | 5/2016 | Jagannathan | H04L 69/24 |
| 9,804,813 B2 | 10/2017 | Fugate et al. | |
| 9,881,425 B1* | 1/2018 | Scott | G06T 15/20 |
| 10,264,215 B1* | 4/2019 | Sadanand | H04N 7/147 |
| 1,044,593 A1 | 10/2019 | Poliakov et al. | |
| 10,585,976 B2* | 3/2020 | Seo | G06F 40/143 |
| 1,066,503 A1 | 5/2020 | Brimhall et al. | |
| 2002/0010655 A1 | 1/2002 | Kjallstrom | |
| 2007/0162942 A1 | 7/2007 | Hamynen et al. | |
| 2010/0033484 A1 | 2/2010 | Kim et al. | |
| 2010/0082780 A1 | 4/2010 | Muilenburg et al. | |
| 2011/0134108 A1 | 6/2011 | Hertenstein | |
| 2012/0036225 A1 | 2/2012 | Chor | |
| 2012/0192235 A1 | 7/2012 | Tapley et al. | |
| 2012/0327117 A1 | 12/2012 | Weller et al. | |
| 2013/0135344 A1* | 5/2013 | Stirbu | G09G 5/00 |
| | | | 345/629 |
| 2013/0278777 A1* | 10/2013 | Sweet, III | G06F 16/9577 |
| | | | 348/169 |
| 2014/0100994 A1 | 4/2014 | Tatzel et al. | |
| 2014/0267792 A1* | 9/2014 | Mullins | H04N 1/00244 |
| | | | 348/207.1 |
| 2014/0282923 A1 | 9/2014 | Narayan | |
| 2014/0289607 A1* | 9/2014 | Ko | G06F 40/143 |
| | | | 715/234 |
| 2014/0317082 A1 | 10/2014 | Archuleta et al. | |
| 2015/0015609 A1 | 1/2015 | Plasse et al. | |
| 2015/0248503 A1 | 9/2015 | Glunz et al. | |
| 2015/0348329 A1* | 12/2015 | Carre | H04N 21/4784 |
| | | | 345/633 |
| 2015/0365909 A1 | 12/2015 | Cacioppo | |
| 2016/0019723 A1 | 1/2016 | Tapley et al. | |
| 2016/0364793 A1 | 12/2016 | Sacco | |
| 2017/0091330 A1 | 3/2017 | Lin | |
| 2017/0168559 A1* | 6/2017 | Jayadevaprakash | |
| | | | G06K 19/06037 |
| 2017/0293958 A1 | 10/2017 | Tang | |
| 2018/0040166 A1 | 2/2018 | Jaryaraj | |
| 2018/0059902 A1 | 3/2018 | Martin | |
| 2018/0158134 A1* | 6/2018 | Hassan | G06F 16/955 |
| 2019/0026272 A1* | 1/2019 | Kishi | G06Q 30/0201 |
| 2019/0037263 A1* | 1/2019 | Nakano | H04N 21/4755 |
| 2019/0095542 A1 | 3/2019 | Westerberg | |
| 2019/0156585 A1* | 5/2019 | Mott | G06T 19/20 |
| 2019/0340834 A1 | 11/2019 | Martinez Molina et al. | |
| 2019/0371073 A1 | 12/2019 | Harviainen | |
| 2020/0066050 A1* | 2/2020 | Ha | G06Q 30/04 |
| 2020/0219319 A1* | 7/2020 | Lashmar | H04L 63/10 |
| 2020/0286303 A1 | 9/2020 | Brimhall et al. | |
| 2020/0293178 A1* | 9/2020 | Kumar | H04L 67/22 |
| 2020/0302681 A1* | 9/2020 | Totty | G06T 7/74 |
| 2020/0357188 A1* | 11/2020 | Kurabayashi | G06K 7/10564 |

OTHER PUBLICATIONS

Barnes, "Methods to strip queries from URLS in Google analytics," Bounteous, retrieved from URL <htBrimhall et al.tps://www.bounteous.com/insights/2015/04/17/strip-query-parameters-google-analytics/>, 2015, 11 pages.

Carpignoli, "How to deliver AR on the web only with a QR code," Medium, retrieved from URL <https://medium.com/chialab-open-source/how-to-deliver-ar-on-the-web-only-with-a-qr-code-e24b7b61f8cb>, 2018, 7 pages.

Chacon, "How to shop on Instagram with augmented reality," Later, retrieved from URL <https://later.com/blog/instagram-augmented-reality-shopping/>, 2019, 11 pages.

Gauld, "Introducing Zappar WebAR," Zappar, retrieved from URL <https://www.zappar.com/blog/introducing-zappar-mobile-webar/>, 2019, 12 pages.

Zhao, "This augmented reality app is the final nail in the QR code's hideous coffin," Gizmodo, retrieved from URL <https://gizmodo.com/this-augmented-reality-app-is-the-final-nail-in-the-qr-5915944>, 2012, 2 pages.

Hiraishi et al., "WWW Visualization Tools for Discovering Interesting Web Pages," Progress in Discovery Science in Lecture Notes in Artificial Intelligence, Jan. 2002, 2281:650-660.

PCT International Search Report and Written Opinion in International Appln. No. PCT/US2020/050191, dated Nov. 20, 2020, 14 pages.

Zdun, "Reengineering to the Web: A Reference Architecture," Presented at Proceedings of the Sixth European Conference on Software Maintenance and Reengineering, Mar. 13, 2002, Budapest, Hungary, 10 pages.

* cited by examiner

AUGMENTED REALITY PRESENTATION USING A UNIFORM RESOURCE IDENTIFIER

CROSS-REFERENCE TO RELATED APPLICATIONS

This application is a continuation of U.S. application Ser. No. 16/752,566, filed Jan. 24, 2020, which is incorporated by reference.

BACKGROUND

Systems can use three-dimensional ("3D") models to represent objects. For instance, an augmented reality ("AR") system, virtual reality ("VR") system, or web browser can use 3D models to represent objects in the corresponding environment. The models might be outside a field of view and affect presentation of objects inside the field of view, e.g., a ball that is bouncing on a chair.

SUMMARY

This specification describes techniques, methods, systems, and other approaches for presenting an augmented reality experience. Augmented reality experiences may involve displaying virtual objects within a view of a real-world scene, and may be performed using mobile computing devices that are equipped with cameras and that are enabled to provide such experiences. However, some online sessions in which images of objects are presented on web resources are conducted on computing devices that are not augmented reality enabled, such as desktop computers, kiosk computers, and other such devices. For example, a web page presented by a web browser running on a desktop computing device can present an image of an object with which a user wants to engage in an augmented reality experience. In the present example, the user can transfer object, user, session information, or a combination of these, from the non-enabled device to another computing device that is augmented reality enabled, such as a smartphone. To transfer the information, for example, the user can select a control on the web page presented by the web browser running on the desktop computing device, and in response, the web page can generate an image that encodes the object, user, session information, or a combination of two or more of these. The smartphone can then capture the encoded image, e.g., using a camera based on user input, and decode the encoded information and use the information to launch an augmented reality experience that includes the object, and to associate an online session on the smartphone with the online session on the desktop computing device. As another example, a virtual reality experience that includes the object can be launched, and the virtual reality experience facilitated by a virtual reality enabled device can be associated with the online session on the desktop computing device.

In general, one innovative aspect of the subject matter described in this specification can be embodied in methods that include the actions of receiving, by a mobile device web browser, data for a web page associated with a uniform resource indicator and including augmented reality data for a plurality of augmented reality presentations; selecting, by the mobile device web browser, an augmented reality presentation from the plurality of augmented reality presentations for the web page by: (i) parsing the uniform resource indicator, (ii) detecting one or more augmented reality presentation parameters in the parsed uniform resource indicator, and (iii) selecting, from the augmented reality data for the plurality of augmented reality presentations, particular augmented reality data for the augmented reality presentation identified by the one or more augmented reality presentation parameters; automatically presenting, by the mobile device web browser, the augmented reality presentation for the web page using the particular augmented reality data for the augmented reality presentation from the plurality of augmented reality presentations, and data from a camera included in a mobile device executing the mobile device web browser; after automatically presenting the augmented reality presentation, receiving, by the mobile device web browser, data indicating that the augmented reality presentation should end; and after receiving the data indicating that the augmented reality presentation should end, presenting, by the mobile device web browser, the web page using the data for the web page.

Other embodiments of this aspect include corresponding computer systems, apparatus, computer program products, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. Receiving the data for the web page may include receiving data that is independent of an underlying operating system of the mobile device. The augmented reality data may be specific to the mobile device, an account for a user of the mobile device, or both. The augmented reality data may include a three-dimensional model of an object. The one or more augmented reality presentation parameters may include a presentation angle parameter for specifying an initial presentation angle of the three-dimensional model of the object. The one or more augmented reality presentation parameters may include a color parameter for specifying an initial presentation color of the three-dimensional model of the object. The one or more augmented reality presentation parameters may include a size parameter for specifying an initial presentation size of the three-dimensional model of the object. Image data that encodes the uniform resource indicator may be received from a camera of the mobile device. The mobile device may determine the uniform resource indicator from the image data, and provide the uniform resource indicator to the mobile device web browser. The image data may be determined from an image that is visually presented by a computing device that is different from the mobile device and is captured by the camera of the mobile device. The uniform resource indicator encoded in the image data that is visually presented by the computing device may include a session identifier, and the mobile device web browser may associate a first user session for the computing device with a second user session on the mobile device. The augmented reality presentation may be automatically presented in response to determining that the mobile device is enabled to generate the augmented reality presentation. Presenting the web page may occur without the mobile device requesting additional content from a server system after receipt of the data indicating that the augmented reality presentation should end. For each of two or more web page components, the component may be generated by the mobile device web browser. For a first web page component from the two or more web page components, an identifier may be detected for the web page component in the uniform resource indicator. The augmented reality presentation may be selected for the first web page component using the detected identifier for the web page component in the uniform resource indicator. For a second web page component, it may be determined to skip analysis of the uniform resource indicator in response to the determination by the first web page component.

The subject matter described in this specification can be implemented in various embodiments and may result in one or more of the following advantages. In some implementations, the features described in this document improve a system, for example, by providing complete web page content (e.g., along with supplemental content) to a client device which is then able to dynamically adjust the content presented based on the URL while still having the option of presenting the "base" web page. For example, the URL can indicate that the client should load the base web page and launch the AR experience, after which the client device can present the base web page without requesting additional content from the server. In some implementations, a client device loading a web page in the background while presenting an AR experience, e.g., both based on a single URL, improves load time. In some implementations, by using the same web page content to render web pages on different computing devices and/or associating augmented reality presentations with controls (e.g., buttons) used for launching object-specific augmented reality experiences on the different web pages, a consistent web page code base can be maintained, e.g., on a server, while providing consistent, flexible, user experiences across different devices, an efficient application of user selections, or both. This can reduce a size of the web page code base that needs to be maintained, for example. In some implementations, by connecting user sessions conducted on different computing devices, e.g., using an encoded image, a system is enabled to apply analytics techniques for attributing web site conversions, determine user interactions that span multiple different devices, or both. In some implementations, a one-touch transition may be provided from a desktop web browsing experience to an AR experience. For example, the one-touch transition can include not only opening a link from an encoded image captured by a camera, but opening the AR experience directly.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Augmented reality experiences may involve displaying virtual objects within a view of a real-world scene, and may be performed using mobile computing devices that are equipped with cameras and enabled to provide such experiences. However, some online sessions in which images of objects are presented on web resources are conducted on computing devices that are not augmented reality enabled, such as desktop computers, kiosk computers, and other such devices. The technology described in this document can provide techniques for transferring object, user, session information, or a combination of these, for an online session from a device that is not enabled to conduct an augmented reality experience to a device that is enabled, in a nearly seamless manner.

Figure 1:
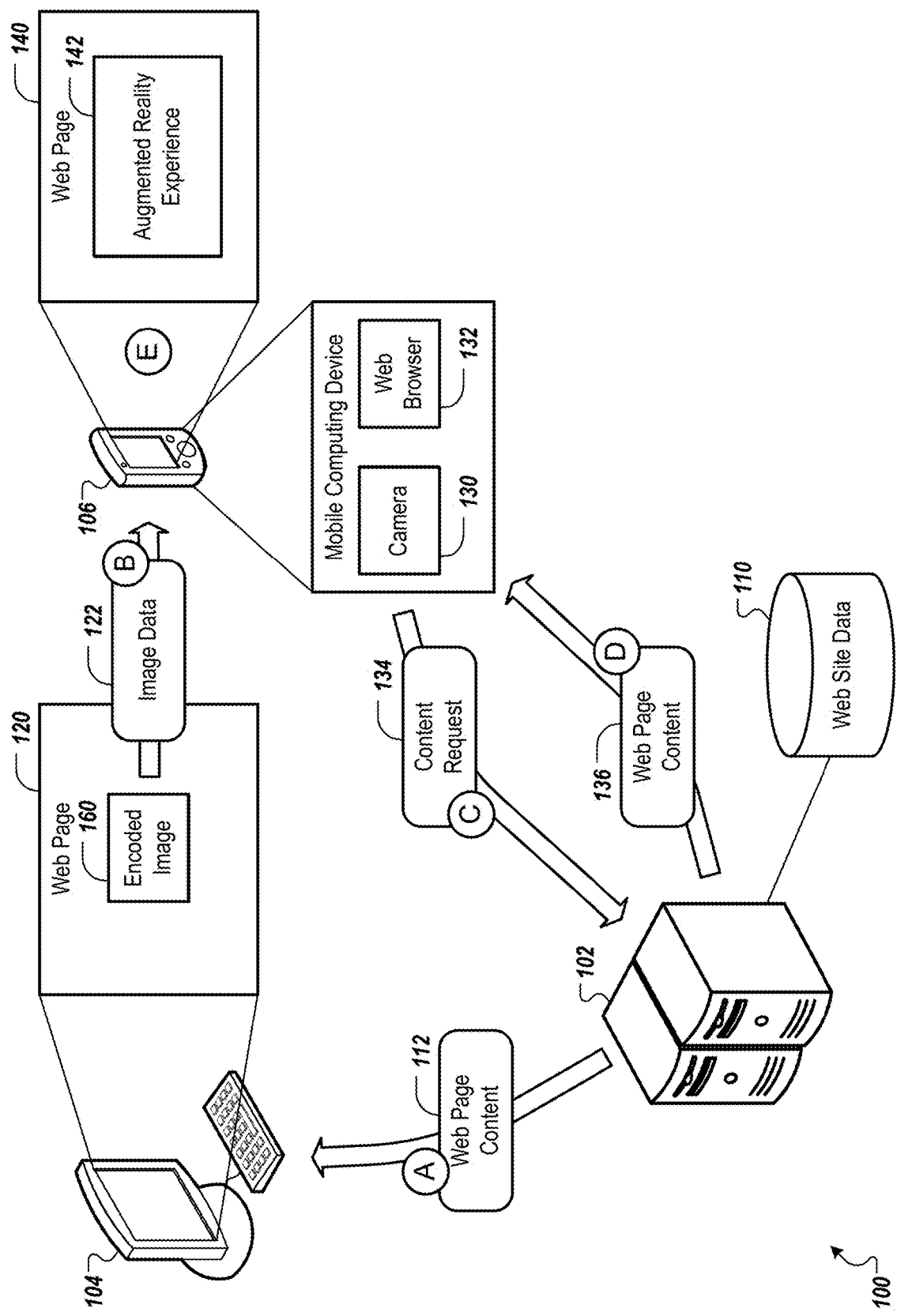
FIG. 1 is an example environment for presenting an augmented reality experience.

FIG. 1 is an example environment 100 for presenting an augmented reality experience. In other examples, the environment 100 may be configured for presenting a virtual reality experience. In the depicted example, the environment 100 includes one or more computer servers 102 that communicate with one or more online computing devices 104 and one or more mobile computing devices 106. Communications between the computing server(s) 102, the online computing device(s) 104, and the mobile computing device(s) 106, for example, can occur over one or more communication networks (not shown), including a LAN (local area network), a WAN (wide area network), and/or the Internet.

In some examples, the computing server(s) 102 can represent various forms of servers, including but not limited to network servers, web servers, application servers, cloud computing servers, or other suitable computing servers. The computing server(s) 102, for example, can access data from various sources (e.g., databases, file systems, and/or cached data sources), can execute software that processes the accessed data, and can provide information based on the accessed/processed data to the online computing device(s) 104 and/or the mobile computing device(s) 106. For example, the computing server(s) 102 can access data from a web site data source 110 that includes data for providing one or more web sites, such as web page data, user history data, data for providing augmented reality experiences, and other suitable data.

In some examples, the online computing device(s) 104 can represent various forms of stationary or mobile processing devices including, but not limited to a desktop computer, a kiosk computer, a laptop computer, a tablet computer, a personal digital assistant (PDA), a smartphone, or other processing devices. In some examples, the mobile computing device(s) 106 can represent various forms of mobile processing devices including, but not limited to a tablet computer, a personal digital assistant (PDA), a smartphone, a headset computer, or other processing devices. The online computing device(s) 104 and the mobile computing device(s) 106, for example, can run web browsers that can execute scripts that are provided with resource data.

FIG. 1 also illustrates an example process flow for presenting an augmented reality experience, and/or a virtual reality experience, shown in stages (A) to (E). Stages (A) to (E) may occur in the illustrated sequence, or they may occur in a sequence that is different than in the illustrated sequence, and/or two or more stages (A) to (E) may be concurrent or partially concurrent.

Figure 2:
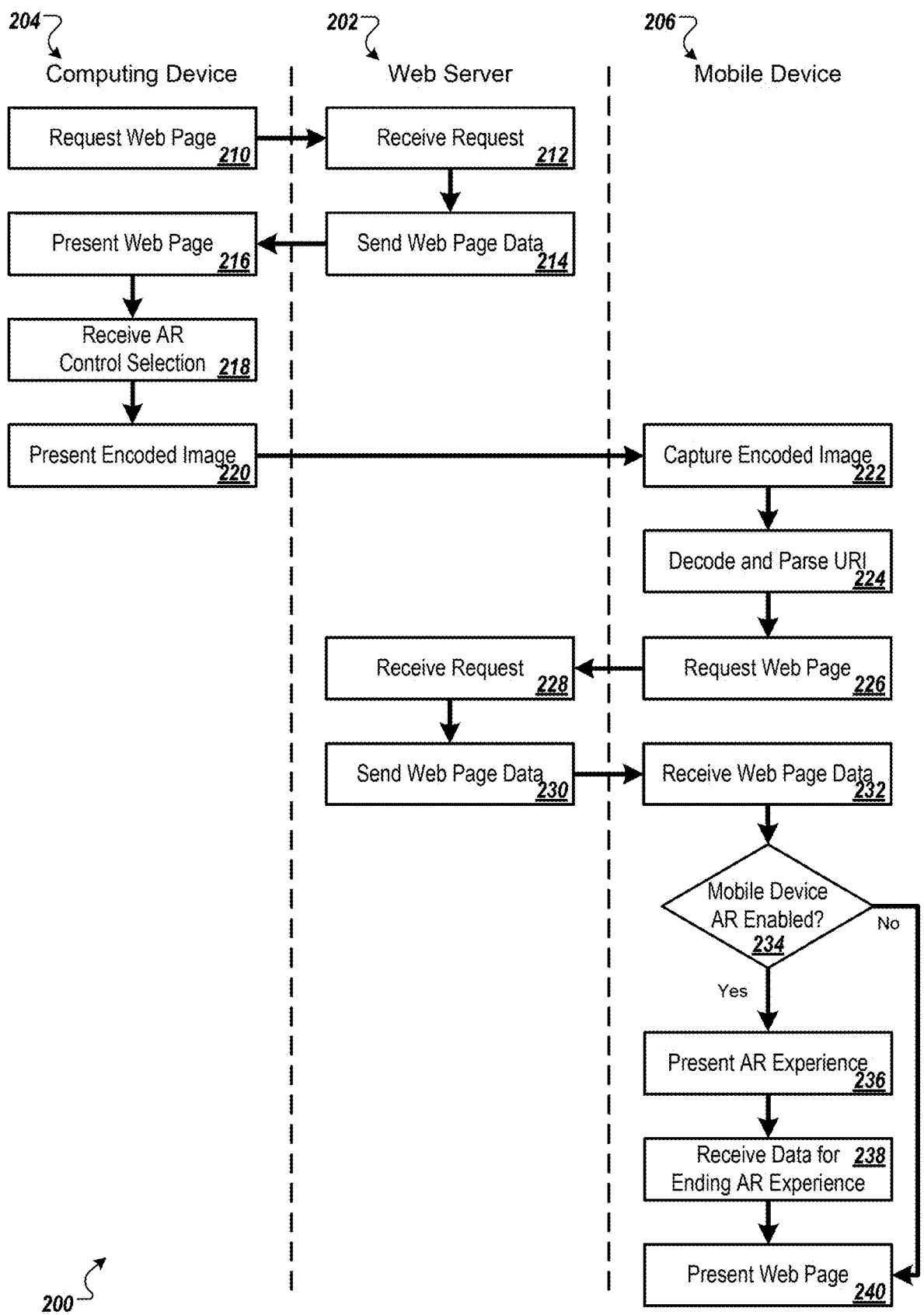
FIG. 2 is a flow diagram of an example process for presenting an augmented reality experience.

Referring now to FIG. 2, an example process 200 is shown for presenting an augmented reality experience. In other examples, the process 200 may present a virtual reality experience. The process 200 can be performed by components of the environment 100, for example, and will be described with reference to FIG. 1. However, other systems may be used to perform the same or similar process.

At (210), a computing device 204 (e.g., similar to the online computing device 104, shown in FIG. 1) can request a web page from a web server 202 (e.g., similar to the computing server(s) 102, also shown in FIG. 1). For example, a user of computing device 204 can provide input that identifies the web page (e.g., using a physical or virtual keyboard to enter a uniform resource locator ("URL"), using a microphone to specify an address or keyword for an online resource, using a pointer device or touchscreen to select a resource link, or using another sort of input device), and the computing device 204 can provide the input to a web browser that requests the web page from the web server 202. In the present example, the requested web page can be a page from an e-commerce web site, however other sorts of web resources may be requested in other examples.

At (212), the web server 202 can receive the request, and in response, can send web page data (214) to the computing device 204. Referring again to FIG. 1, for example, during stage (A), computing server 102 can access the web site data store 110, can retrieve web page content 112 for the requested web page, and can provide the web page content 112 to online computing device 104 in response to the request.

At (216), the computing device 204 can present the requested web page. Referring again to FIG. 1, for example, the online computing device 104 can use the received web page content 112 to render web page 120 for presentation on a device display.

Figure 3A:
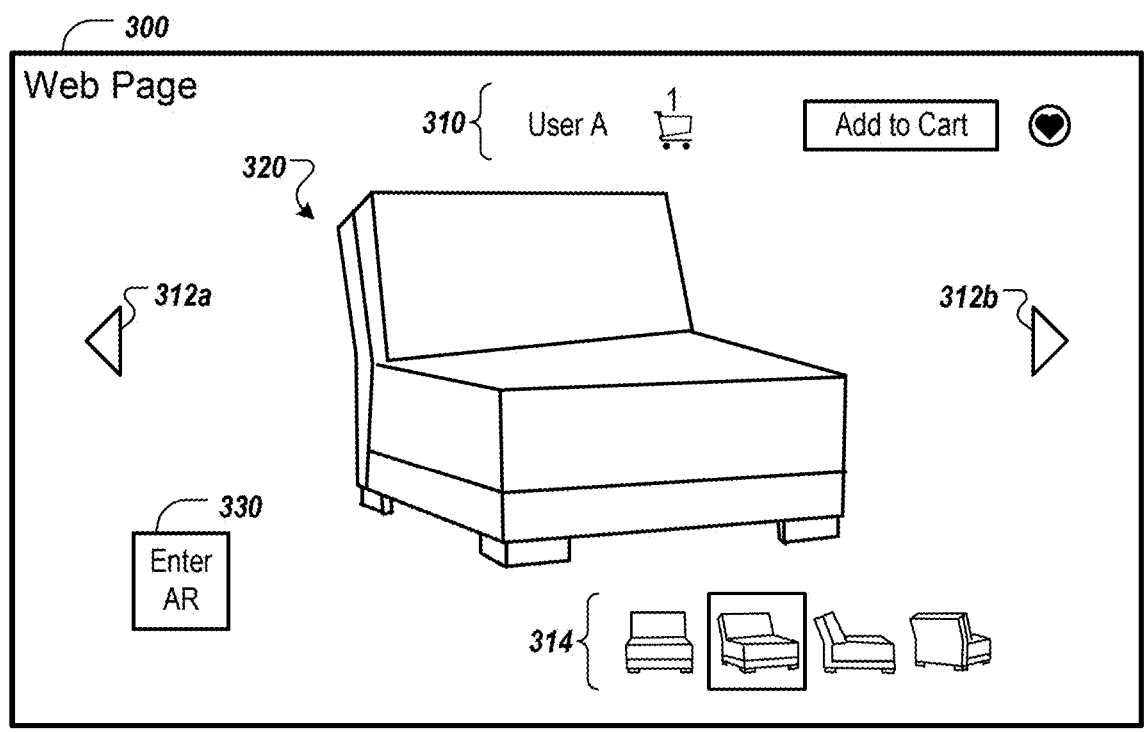
FIGS. 3A-B are example interfaces for selecting an augmented reality experience.

Referring now to FIG. 3A, an example interface 300 (e.g., similar to web page 120) for selecting an augmented reality experience is shown. In the present example, the interface 300 includes various controls 310 to facilitate an online shopping session conducted by a user (e.g., User A), such as one or more controls for logging into or out of a web site, accessing an online shopping cart, adding items to the shopping cart, bookmarking items, and so forth.

The interface 300 in the present example also includes image selection controls 312a and 312b. By interacting with the image selection controls 312a, 312b, for example, the user can toggle through various images 314 of an object (e.g., a chair) being presented on interface 300, with the currently selected image of the object being presented in greater detail at image presentation area 320. As another example, the user can directly select (e.g., click on) one of the images 314 of the object, and the selected image of the object can be presented in greater detail at image presentation area 320. In the present example, the various selectable images 314 of the object include different presentation angles (e.g., front, side, rear, etc.), however in other examples, the various selectable images 314 may include different colors of the object, different sizes of the object, and/or other different object property values. In some implementations, images of multiple different objects may be selectable on the interface 300. For example, the various selectable images 314 can include images of different objects, such as an image of a chair, an image of a table, an image of a lamp, and so forth.

In the present example, the interface 300 includes a control 330 for facilitating an augmented reality experience with an object (e.g., an item, such as the chair) being presented on the interface 300. In some implementations, the interface 300 can include multiple controls 330, e.g., for different objects, different colors of the object, different sizes of the object, or a combination of two or more of these. In general, augmented reality experiences can involve displaying one or more virtual objects within a view of a real-world scene in real-time. For example, a 3D model of an object can be rendered by a computing device and a virtual image of the object can be integrated with a real-world scene (e.g., a user's environment), such that the virtual image of the object appears to a user to be part of the real-world scene.

Hardware components for implementing the augmented reality experience can include processors, displays, and input devices, e.g., cameras, among other hardware components. For example, mobile computing devices such as tablet computers, personal digital assistants, smartphones, headset computers, or other mobile computing devices can include cameras that capture real-time images of the real-world scene, processors that render the 3D model of the object to generate the virtual image and register the virtual image within the real-world scene, and displays to present composite images including the real-world scene and the virtual image of the object. Mobile computing devices may be preferable to stationary computing devices for facilitating augmented reality experiences. As a mobile computing device moves, for example, the real-world scene may change, and the virtual image of the object may be continually modified by the processors to maintain the object's orientation with respect to the scene. Further, some stationary computing devices (e.g., desktop computers) may not be equipped with cameras, or may not otherwise be configured to facilitate augmented reality experiences. However, online shopping sessions are often initiated using such stationary computing devices. By interacting with the control 330, for example, a user can launch a streamlined process for initiating an augmented reality experience, including transferring object and/or session information from a computing device that is not configured to facilitate the experience (e.g., a stationary computing device) to a computing device that is configured to facilitate the experience (e.g., a mobile computing device).

Referring again to FIG. 2, at (218), the computing device 204 (e.g., a stationary computing device that is not configured to facilitate an augmented reality experience) can receive an augmented reality control selection (e.g., a user selection of the control 330, shown in FIG. 3). In response to receiving the augmented reality control selection, for example, the computing device 204 can present an encoded image (220).

Figure 3B:
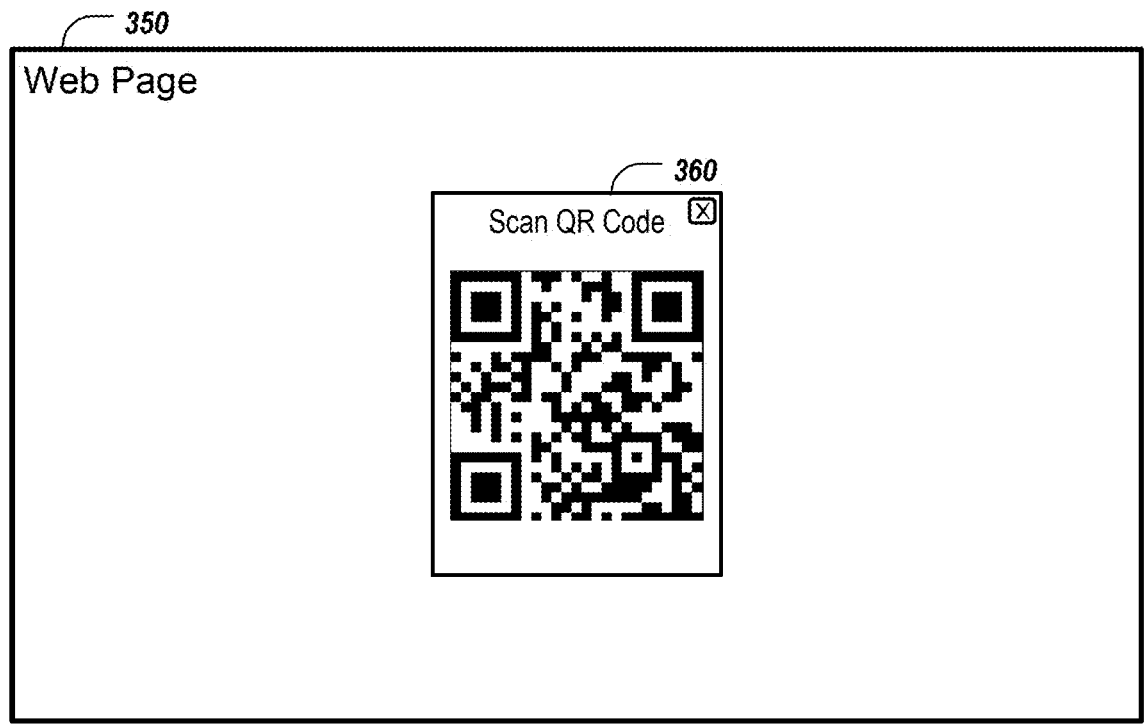

Referring now to FIG. 3B, for example, an example interface 350 (e.g., similar to or a portion of the web page 120) is shown for facilitating an augmented reality experience. In the present example, the interface 350 includes an encoded image 360 (e.g., a QR code, smart image, or another suitable encoded image) that encodes an address of a resource (e.g., a web page) that can provide an augmented reality experience for one or more objects (e.g., the chair) selected by the user through the interface 300 (shown in FIG. 3A). As another example, a provided resource (e.g., a promotional e-mail) can include, for each of one or more objects, a corresponding encoded image for launching an augmented reality experience for the object. The objects included in the provided resource, for example, can be selected by a recommendation engine (not shown). As another example, a printed page can include one or more encoded images for launching augmented reality experiences for objects.

In some implementations, encoded images may encode one or more augmented reality presentation parameters, one or more user parameters, and/or one or more session parameters. For example, the augmented reality presentation parameters in encoded image 360 can specify an object and/or various presentation properties of the object, such as presentation angle, presentation color, presentation size, and/or other suitable presentation properties. The presentation parameters, for example, can correspond to properties of the object that has been selected by the user prior to launching the process for initiating the augmented reality experience. In the present example, the user has selected from the various selectable images 314 (shown in FIG. 3A) an image of the chair at a front-facing angle. User parameters and/or session parameters, for example, can include user identifiers and/or session identifiers for an online session being conducted by the user on the computing device 204. For example, the user can log into an online shopping web site using the computing device 204, and the web server 202 can generate a unique session identifier for the user's current session. As another example, presentation parameters, user parameters, and/or session parameters may be included in other sorts of resources, e.g., in encoded images provided in promotional e-mails, printed pages, etc., such that a resource from which an augmented reality presentation has been launched can be identified.

At (222) an encoded image can be captured by a mobile device 206 (e.g., similar to the mobile computing device 106, shown in FIG. 1). For example, a user of mobile device 206 (e.g., possibly the same user of computing device 204, or a different user) can use a capture device of the mobile device 206 to capture the encoded image. Referring again to FIG. 1, for example, during stage (B), mobile computing device 106 can receive image data 122 by capturing encoded image 160 (e.g., similar to encoded image 360, shown in FIG. 3B) on web page 120 (e.g., similar to interface 350, also shown in FIG. 3B), using a camera 130 or another suitable image capture or scanning device.

At (224), the mobile device 206 can decode the captured encoded image, and parse the decoded data to determine a uniform resource identifier ("URI") from the data. Referring again to FIG. 1, for example, mobile computing device 106 can decode the image data 122 received from the camera 130, can determine the URI, and can provide the URI to the device's web browser 132. For example, the web browser 132 can be a full native web application executed by the mobile computing device 106, a web container loaded by another application executed by the device 106, or another appropriate type of web browser instance.

At (226), the mobile device 206 can request a web page from the web server 202. Referring again to FIG. 1, for example, during stage (C), the web browser 132 running on the mobile computing device 106 can provide a content request 134 to one or more of the computing servers 102, based on the URI decoded from the image data 122. For example, the web browser 132 can request a resource (e.g., a web page) indicated by the URI, which can optionally include one or more augmented reality presentation parameters, one or more user parameters, and/or one or more session parameters.

At (228), the web server 202 can receive the request, and in response, can send web page data (230) for receipt (232) by the mobile device 206. Referring again to FIG. 1, for example, during stage (D), computing server(s) 102 can access web page content 136 for the requested web page in the web site data source 110, and can provide the web page content 136 to mobile computing device 106 in response to the request. The web page content 136, for example, can include data for a web page 140 associated with the URI decoded from the image data 122. The data for the web page 140, for example, can include augmented reality data for a plurality of augmented reality presentations. In the present example, the web page content 136 for rendering the web page 140 can be the same web page content 112 for rendering the web page 120 (e.g., the online shopping interface 300 depicting the chair). In some examples, the web page content 136 for rendering the web page 140 can be different from the web page content 112 for rendering the web page 120.

In some implementations, receiving the data for the web page may include receiving data that is independent on an underlying operating system of the mobile device. For example, the web page content 136 can include data for rendering the web page 140 and/or for providing an augmented reality experience 142 (e.g., within the web page 140 or another application) on a variety of different computing devices, and as such, the same web page content 136 can be provided in response to similar content requests. When processing the web page content 136 to render the web page 140 and/or provide the augmented reality experience 142, for example, the mobile computing device 106 can process the received data using particular operating system and/or web browser. This may enable the computing server(s) 102 to provide the same web page content 136 to different mobile computing devices 106 irrespective of the underlying hardware, operating system, web browser, or a combination of two or more of these, of the receiving mobile computing device 106, for example.

In some implementations, the augmented reality data may be selected based on the mobile device, an account for a user of the mobile device, or both. For example, the content request 134 can include information that indicates one or more specifications of the mobile computing device 106 (e.g., model, operating system, web browser, etc.), and the one or more computing servers 102 can provide web page content 136 that includes augmented reality data that is configured for use on the specific device. As another example, the content request 134 can include a user account identifier (e.g., from the encoded image 160 received in the image data 122 and/or from the mobile computing device 106), and the one or more computing servers 102 can provide web page content 136 that includes augmented reality data that is based on the user account. For example, the one or more computing servers 102 can access the web site data 110, and can identify augmented reality presentation parameters (e.g., angles, colors, and/or sizes) of objects that have previously been selected by the user and have been previously been used in augmented reality experiences by the user, and can provide such parameters (and/or can provide a model of an object having such parameters) to the mobile computing device 106 for use in generating the augmented reality experience 142. The user, for example, may have previously engaged in augmented reality experiences with other objects (e.g., other chairs), and previously specified augmented reality presentation parameters for the other objects, such as presentation angle (e.g., front-facing), presentation color (e.g., brown), and presentation size (e.g., large). The previously specified presentation parameters can be applied when presenting a virtual image of an object, for example, when such parameters have not been explicitly specified through the encoded image 160, such that augmented reality experiences for the user account may be consistent across several different objects.

In some implementations, the augmented reality data may include a three-dimensional model of an object. For example, the web page content 136 that includes augmented reality data can include a three-dimensional model of the object (e.g., the chair) selected by the user on the interface 300 (shown in FIG. 3A). In the present example, a base model of the object can be provided in the augmented reality data, which can be rendered according to various presentation parameters (e.g., angle, color, size, etc.) by the mobile computing device 106 when presenting a virtual image of the model in the augmented reality experience 142. As another example, multiple different models of the object can be provided in the augmented reality data (e.g., a different model for each of the various selectable images 314, shown in FIG. 3A), and an appropriate one of the models can be selected and rendered according to the presentation parameters. In some examples, the computing server(s) 102 can select one of the multiple different models and include data for the selected model in the augmented reality data. The selected model can be based on the control 330 in the interface 300 for which the computing device 104 presented the encoded image 160.

In some implementations, a user session conducted on the online computing device 104 can be associated with a user session conducted on the mobile computing device 106. For example, the URI decoded from the image data 122 can include a user account identifier and/or a session identifier for the session being conducted on the online computing device 104 at a time when the encoded image 160 is presented on the web page 120. The mobile computing device 106, for example, can provide the user account/session identifier in the content request 134, and the computing server(s) 102 can provide web page content 136 that facilitates a connection and/or continuation of the user session on the mobile computing device 106. For example, if the computing device 104 presented data for a particular web site while a user account is logged in, the web page content 136 can facilitate a process for logging in the user account into the same web site, or can automatically log the user account into the web site while using the mobile computing device 106. The session identifier generated for the user's session on the online computing device 104, for example, can be provided by the computing server(s) 102 for use during the user's session on the mobile computing device 106. By connecting user sessions conducted on the online computing device 104 and the mobile computing device 106, for example, the systems described in this document can improve conversion tracking accuracy that could be lost if the user sessions were to be considered in isolation.

At (234), the mobile device 206 can determine whether it is enabled to conduct an augmented reality experience. Referring again to FIG. 1, for example, the mobile computing device 106, e.g., the web browser 132, can check the device's specifications (e.g., model, operating system, web browser, etc.), to determine whether the device, browser, or both, are augmented reality enabled or not. As another example, if the mobile computing device 106 is unable to locally determine whether the device/browser is augmented reality enabled, the device 106 communicate with a web service (not shown) that can make the determination.

If the mobile device 206 is not augmented reality enabled, for example, the mobile device 206 can present the web page (240). Referring again to FIG. 1, for example, the web browser 132 of the mobile computing device 106 can use web page data included in the web page content 136 to present the web page 140 without the augmented reality experience 142. In some implementations, a notification may be provided that a mobile device is not augmented reality enabled. For example, the mobile computing device 106 can present a message on the web page 140 that the device is not enabled to facilitate an augmented reality experience.

If the mobile device 206 is augmented reality enabled, for example, the mobile device 206 can present an augmented reality experience (236). In some examples, presenting the augmented reality experience may include selecting, by a web browser, a particular augmented reality presentation from a plurality of augmented reality presentations for a web page. Referring again to FIG. 1, for example, during stage (E), the mobile computing device 106 can use the web browser 132 to select an augmented reality presentation from multiple different augmented reality presentations that may occur on the web page 140, and can select an appropriate augmented reality presentation for the augmented reality experience 142. To select the augmented reality presentation, for example, the web browser 132 can execute code that parses the URI of the web page 140, and detects one or more augmented reality presentation parameters in the parsed URI. Based on the one or more augmented reality presentation parameters, for example, the web browser 132 can select particular augmented reality data for the augmented reality presentation identified by the parameter(s), from the web page content 136 received from the one or more computing servers 102. Selecting particular augmented reality data, for example, can include selecting from among multiple different models of an object according to the parameter(s) and/or modifying a base model according to the parameter(s).

In some implementations, the one or more augmented reality presentation parameters may include a presentation angle parameter for specifying an initial presentation angle of a three-dimensional model of an object. For example, the three-dimensional model of the object can rotated along X, Y, and/or Z axes according to the presentation angle parameter when rendering a virtual image of the object for presentation in the augmented reality experience 142. The presentation angle parameter, for example, can be specified by a user that interacts with the web page 120 (e.g., through selection of one of the selectable images 314, shown in FIG. 3A). As another example, the presentation angle parameter can be specified by the one or more computing servers 102, based on a presentation angle parameter used to present a virtual image of another object to a user during a prior augmented reality experience. For example, when engaging in augmented reality experiences with a furniture web site, the user may have previously oriented virtual images of objects (e.g., furniture) such that the objects are front-facing or depict another particular side of the object, e.g., the left side, right side, or rear. Such user preference data can be maintained by the computing server(s) 102 in the web site data store 110, and referenced when providing the web page content 136 including augmented reality data to the mobile computing device 106, to indicate that subsequent virtual objects are to be initially presented in a similar orientation as prior virtual objects.

In some implementations, the one or more augmented reality presentation parameters may include a color parameter for specifying an initial presentation color of a three-dimensional model of an object. For example, the three-dimensional model of the object can be rendered in a variety of different colors according to the presentation color parameter when rendering a virtual image of the object for presentation in the augmented reality experience 142. Presentation colors, for example, can include various color properties, such as hue, saturation, lightness, and other suitable color properties, and/or can include various color patterns, such as roughness, bumpiness, shininess, and other suitable color patterns, e.g., to simulate materials such as leather, cloth, iron, chrome, and so forth. The presentation color parameter, for example, can be specified by a user that interacts with the web page 120 (e.g., through selection of one of the selectable images 314, shown in FIG. 3A). As another example, the presentation color parameter can be specified by the one or more computing servers 102, based on a presentation color parameter used to present a virtual image of another object to a user during a prior augmented reality experience. For example, when engaging in augmented reality experiences with a furniture web site, the user may have previously specified that virtual images of objects (e.g., furniture) be presented in a brown color. Such user preference data can be maintained by the computing server(s) 102 in the web site data store 110, and referenced when providing the web page content 136 including augmented reality data to the mobile computing device 106, to indicate that subsequent virtual objects are to be initially presented in a similar color as prior virtual objects.

In some implementations, the one or more augmented reality presentation parameters may include a size parameter for specifying an initial presentation size of a three-dimensional model of an object. For example, the three-dimensional model of the object can be rendered in a variety of different sizes according to the presentation size parameter when rendering a virtual image of the object for presentation in the augmented reality experience 142. The presentation size parameter, for example, can be specified by a user that interacts with the web page 120 (e.g., through selection of one of the selectable images 314, shown in FIG. 3A). As another example, the presentation size parameter can be specified by the one or more computing servers 102, based on a presentation size parameter used to present a virtual image of another object to a user during a prior augmented reality experience. For example, when engaging in augmented reality experiences with a furniture web site, the user may have previously specified that virtual images of objects (e.g., furniture, or other sorts of objects) be presented in a large size. Such user preference data can be maintained by the computing server(s) in the web site data store 110, and references when providing the web page content 136 including augmented reality data to the mobile computing device 106, to indicate that subsequent virtual objects are to be initially presented in a similar size as prior virtual objects.

In some implementations, selecting and presenting an augmented reality presentation may be performed using discrete web page components. The web page 140 (shown in FIG. 1), for example, can include various web page components (e.g., controls, such as buttons 330), each component being implemented through a portion of code (e.g., a script) provided in the web page content 136. Some of the components, for example, can include web page buttons that are used to select images of objects on the web page (e.g., selectable images 314, shown in FIG. 3A). When rendering the web page 140, for example, the web browser 132 can generate each of the page components. For one of the web page components (e.g., a corresponding web page component that has been selected on the corresponding web page 120, shown in FIG. 1), for example, the web browser 132 can detect an identifier for the web page component in the URI, and can select an augmented reality presentation for the web page component based on detection of the identifier.

After selecting the augmented reality presentation, for example, the web browser 132 can determine to skip analysis of the URI for other web page components. By using the same web page content 112, 136 to render web pages on respective devices 104, 106, for example, and associating augmented reality presentations with controls (e.g., buttons) used for launching object-specific augmented reality experiences on the respective web pages 120, 140, a consistent web page code base can be maintained while providing consistent and flexible user experiences across different devices, and an efficient application of user selections. This can also reduce memory storage requirements for the computing server(s) 102 because they provide the same web page content 112, 136 to any device.

In some implementations, presenting the augmented reality experience may include analysis by separate components of the web page 140 whether to present the augmented reality experience 142. In these implementations, the web page content 112, 136 can include data for only a single augmented reality experience. The web page 140 components may analyze the URI to determine which component should initiate the augmented reality experience. The component that initiates the augmented reality experience 142, for example, may affect the presentation of the augmented reality experience 142, content presented after the augmented reality experience 142 ends, or both. For instance, a component for a perspective view object that is right facing can initiate an augmented reality experience with the rendered object right facing, whereas a component for a perspective view object that is left facing would initiate an augmented reality experience with the rendered object left facing. When an augmented reality experience for the right facing object ends, for example, the web page 140 can present the component associated with that right facing perspective view, e.g., a perspective right facing image of the object. In contrast, when an augmented reality experience for the left facing object ends, the web page 140 can present the component associated with that left facing perspective view, e.g., a perspective left facing image of the object.

After selecting the augmented reality presentation, for example, the web browser 132 of the mobile computing device 106 can automatically present the augmented reality presentation for the web page 140, and can conduct the augmented reality experience 142 (e.g., within the web page 140 or another application). In some implementations, the augmented reality presentation may be automatically presented in response to determining that the mobile device is enabled to generate the augmented reality presentation. For example, after the mobile computing device 106 captures the image data 122 using the camera 130, the mobile computing device 106 can, without user input, provide the content request 134 to the computing server(s) 102, receive the web page content 136 from the computing server(s), and render the web page 140 with the augmented reality experience 142.

Figure 4A:
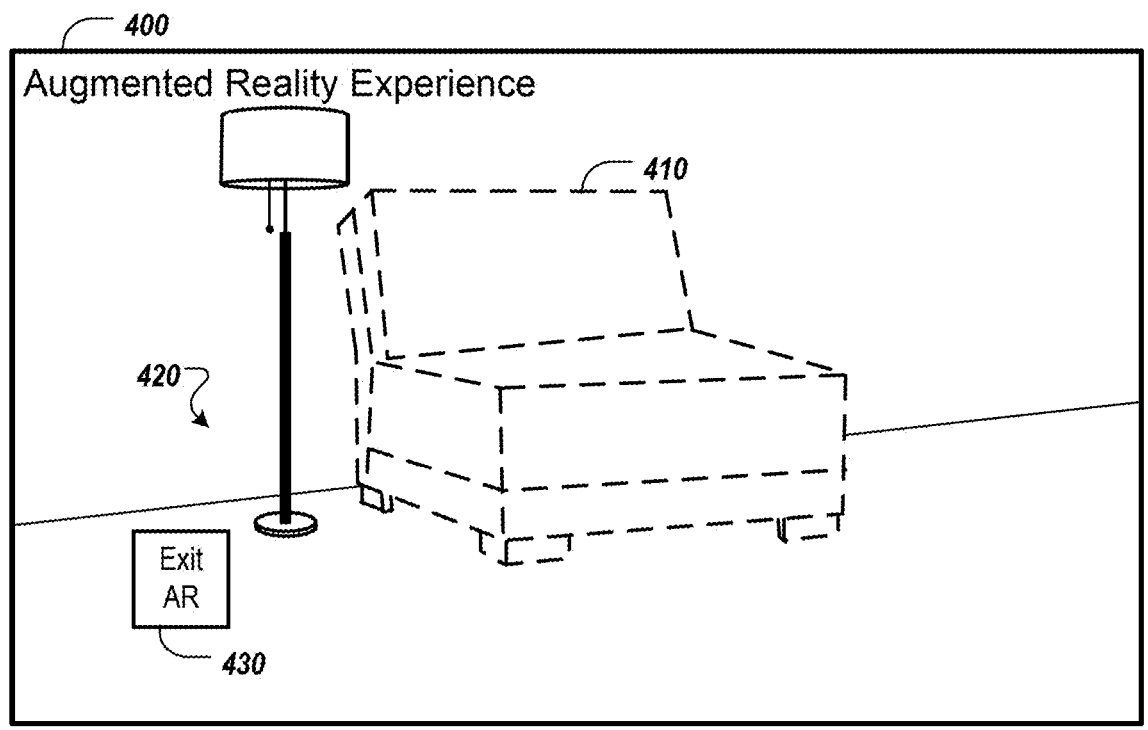
FIGS. 4A-B are example interfaces for presenting an augmented reality experience.

Referring now to FIG. 4A, an example interface 400 (e.g., similar to web page 140, shown in FIG. 1) for presenting an augmented reality experience is shown. For example, the interface 400 incorporates a virtual image 410 of an object (e.g., a chair) that is initially rendered according to the one or more augmented reality presentation parameters in the parsed uniform resource indicator (e.g., front-facing angle, brown color, large size). The augmented reality presentation in the present example also includes data from the camera 130 (shown in FIG. 1) of the mobile computing device 106 (also shown in FIG. 1), which is used to capture the real-world scene 420. As shown in the present example, the virtual image 410 of the object is integrated into the real-world scene 420, and a composite image of the image 410 and the scene 420 is presented on the interface 400. The virtual image 410 can be registered within the real-world scene 420, for example, such that changes in the scene 420 caused by positional changes of the camera 130 can cause appropriate changes to the virtual image 410 of the object, to reflect a different perspective from the camera's point of view.

Figure 4B:
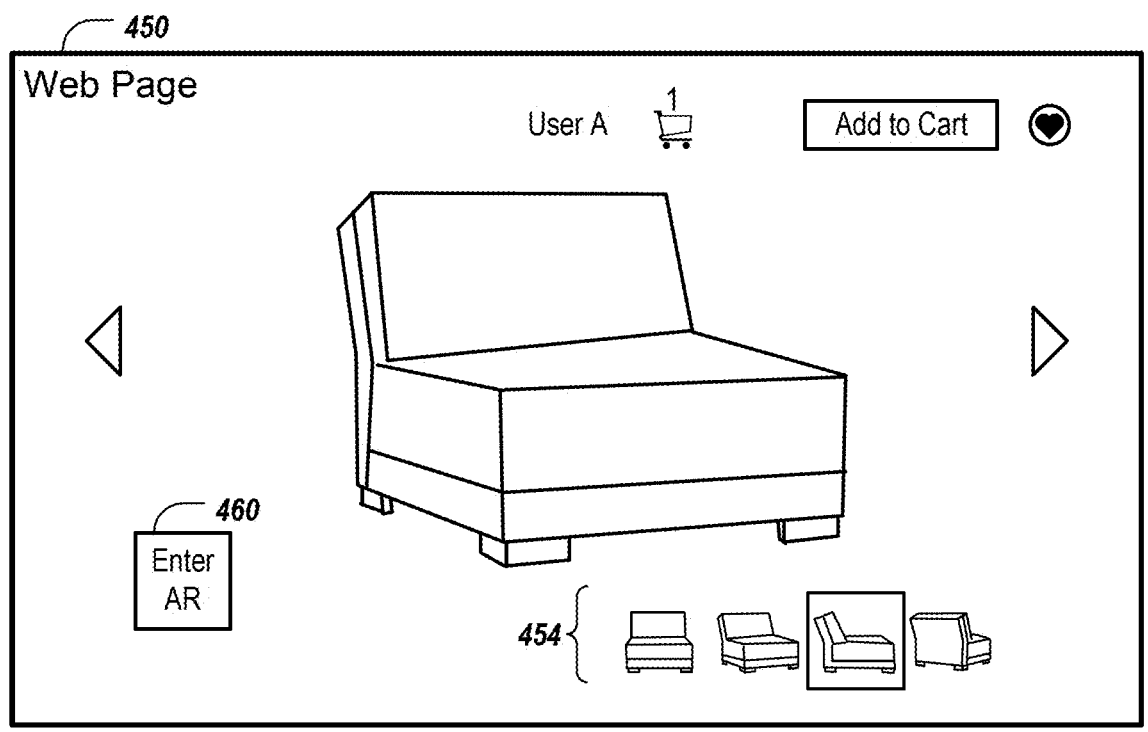

Referring again to FIG. 2, at (238), the mobile device 206 can receive data indicating that the augmented reality presentation should end, and in response, can present the web page (240). As shown in FIG. 4A, for example, the interface 400 can include a control 430 through which a user can end the augmented reality presentation. In response to user selection of the control 430, for example, the web browser 132 of the mobile computing device 106 can end the augmented reality presentation and can present web page 450 (shown in FIG. 4B).

In some implementations, presenting a web page can occur without the mobile device requesting additional content from a server system after receipt of the data indicating that the augmented reality presentation should end. For example, the web browser 132 can use web page data included in the web page content 136 previously received by the mobile computing device 106 to present the web page 450 without requesting additional data from the computing server(s) 102. The user may continue interactions with the web page 450, for example, by selecting another selectable image 454 of an object, and starting another augmented reality experience that includes a virtual image of a model that corresponds to the selected image of the object. In contrast to control 330 (shown in FIG. 3A) that may be used to generate encoded image 360 (shown in FIG. 3B) for launching an augmented reality experience with an object on another device, for example, user selection of control 460 (shown in FIG. 4B) can enable the user to enter an augmented reality experience with the object on the same device. Functionality of an augmented reality launching control (e.g., 330, 460), for example, can be determined by a web browser that presents the control, and can vary based on device/browser capabilities. User selections for the augmented reality experience can be provided by the mobile computing device 106 (shown in FIG. 1) to the computing server(s) 102 (also shown in FIG. 1), for example, to be maintained with the user's account information in web site data 110 (also shown in FIG. 1). Such user selections, for example, can be used to select and/or modify a model of an object when initially presenting a virtual image of the object during subsequent augmented reality experiences.

The order of operations described above with respect to the process 200 is illustrative only, and can be performed in different orders. For example, the mobile computing device 206 can present a web page (240) before presenting an augmented reality experience (236). As another example, the mobile device 206 can determine whether the device is augmented reality enabled (234) before requesting the web page (226).

In some implementations, the process 200 can include additional operations, fewer operations, or some of the operations can be divided into multiple sub-operations. For example, computing device 204 can present an encoded image (220), without receiving an augmented reality control selection (218). As another example, computing device 204 can capture an encoded image (222) without the image having been presented by computing device 204 (e.g., the encoded image may be on a printed page).

For situations in which the systems discussed here collect personal information about users, or may make use of personal information, the users may be provided with an opportunity to control whether programs or features collect personal information (e.g., information about a user's web activity, or a user's preferences), or to control whether and/or how to receive content from the content server that may be more relevant to the user. In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by a content server.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a smart phone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., LCD (liquid crystal display), OLED (organic light emitting diode) or other monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HyperText Markup Language (HTML) page, to a user device, e.g., for purposes of displaying data to and receiving user input from a user interacting with the user device, which acts as a client. Data generated at the user device, e.g., a result of the user interaction, can be received from the user device at the server.

Figure 5:
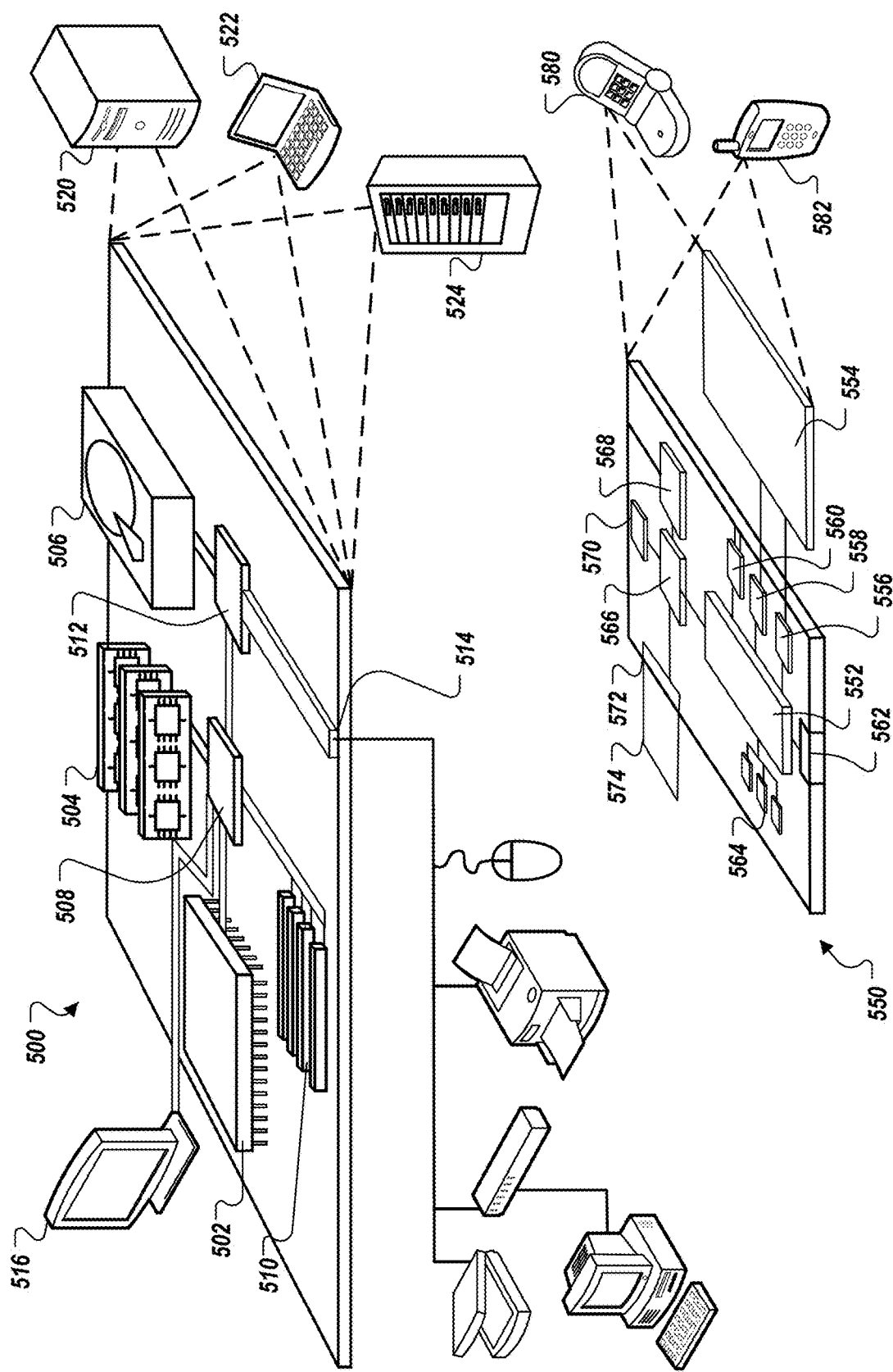
FIG. 5 is a block diagram of a computing system that can be used in connection with computer-implemented methods described in this document.

FIG. 5 is a block diagram of computing devices 500, 550 that may be used to implement the systems and methods described in this document, as either a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, smartwatches, head-worn devices, and other similar computing devices. The components shown here, their connections and relationships, and their functions, are meant to be exemplary only, and are not meant to limit implementations described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a computer-readable medium. In one implementation, the memory 504 is a volatile memory unit or units. In another implementation, the memory 504 is a non-volatile memory unit or units.

The storage device 506 is capable of providing mass storage for the computing device 500. In one implementation, the storage device 506 is a computer-readable medium. In various different implementations, the storage device 506 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of duties is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can process instructions for execution within the computing device 550, including instructions stored in the memory 564. The processor may also include separate analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD display or an OLED display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provided in communication with processor 552, so as to enable near area communication of device 550 with other devices. External interface 562 may provide, for example, for wired communication (e.g., via a docking procedure) or for wireless communication (e.g., via Bluetooth or other such technologies).

The memory 564 stores information within the computing device 550. In one implementation, the memory 564 is a computer-readable medium. In one implementation, the memory 564 is a volatile memory unit or units. In another implementation, the memory 564 is a non-volatile memory unit or units. Expansion memory 574 may also be provided and connected to device 550 through expansion interface 572, which may include, for example, a SIMM card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provided as a security module for device 550, and may be programmed with instructions that permit secure use of device 550. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS receiver module 570 may provide additional wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium," "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A non-transitory computer storage medium encoded with instructions that, when executed by one or more computers, cause the one or more computers to perform operations comprising:

accessing, for presentation of an augmented reality experience using an application executing on a device, augmented reality data for a plurality of augmented reality presentations of a three-dimensional model, the augmented reality data being identified by a uniform resource identifier included in a content request sent to a content system;

accessing presentation parameters for the three-dimensional model;

determining one or more properties of the device on which the application that will present the augmented reality experience is executing;

selecting an augmented reality presentation from the plurality of augmented reality presentations that (i) is configured for the one or more properties of the device and (ii) is associated with the one or more presentation parameters for the three-dimensional model; and causing presentation, by the application, of the augmented reality presentation that (i) is configured for the one or more properties of the device and (ii) is associated with the one or more presentation parameters for the three-dimensional model.

2. The computer storage medium of claim 1, wherein:

determining the one or more properties of the device comprises determining an operating system of the device; and selecting the augmented reality presentation from the plurality of augmented reality presentations comprises selecting, using the operating system of the device, the augmented reality presentation from the plurality of augmented reality presentations that is configured for the operating system of the device and determining to skip selection of the second augmented reality presentation from the plurality of augmented reality presentations that is not configured for the operating system of the device.

3. The computer storage medium of claim 1, wherein:

determining the one or more properties of the device comprises determining a model of the device; and selecting the augmented reality presentation from the plurality of augmented reality presentations comprises selecting, using the model of the device, the augmented reality presentation from the plurality of augmented reality presentations that is configured for the model of the device and determining to skip selection of the second augmented reality presentation from the plurality of augmented reality presentations that is not configured for the model of the device.

4. The computer storage medium of claim 1, wherein:

determining the one or more properties of the device comprises determining a type of the application executing on the device; and selecting the augmented reality presentation from the plurality of augmented reality presentations comprises selecting, using the type of the application executing on the device, the augmented reality presentation from the plurality of augmented reality presentations that is configured for the type of the application executing on the device and determining to skip selection of the second augmented reality presentation from the plurality of augmented reality presentations that is not configured for the type of the application executing on the device.

5. The computer storage medium of claim 4, wherein:

determining the type of the application executing on the device comprises determining a type of a web browser executing on the device; and selecting the augmented reality presentation from the plurality of augmented reality presentations comprises selecting, using the type of the web browser executing on the device, the augmented reality presentation from the plurality of augmented reality presentations that is configured for the type of the web browser executing on the device and determining to skip selection of the second augmented reality presentation from the plurality of augmented reality presentations that is not configured for the type of the web browser executing on the device.

6. The computer storage medium of claim 1, wherein:
accessing the augmented reality data comprises:
  receiving, by the content system and from the device, a content request that includes the uniform resource identifier; and
  retrieving, by the content system and from memory, the augmented reality data that is identified by the uniform resource identifier;
determining the one or more properties of the device comprises determining, by the content system, the one or more properties of the device on which the application that will present the augmented reality experience is executing;
selecting the augmented reality presentation comprises selecting, by the content system and using the one or more properties of the device, an augmented reality presentation from the plurality of augmented reality presentations that (i) is configured for the one or more properties of the device and (ii) is associated with the one or more presentation parameters for the three-dimensional model; and
causing presentation of the augmented reality presentation comprises providing, to the application executing on the device, data for the augmented reality presentation to cause the application to present, on a display for the device, the augmented reality presentation that (i) is configured for the one or more properties of the device and (ii) is associated with the one or more presentation parameters for the three-dimensional model.

7. The computer storage medium of claim 1, wherein:
accessing the augmented reality data comprises:
  providing, by the device and to the content system, a content request that includes the uniform resource identifier; and
  receiving, by the device and from the content system, the augmented reality data that is identified by the uniform resource identifier;
determining the one or more properties of the device comprises determining, by the application that is executing on the device and that that will present the augmented reality experience, the one or more properties of the device;
selecting the augmented reality presentation comprises selecting, by the application and using the one or more properties of the device, an augmented reality presentation from the plurality of augmented reality presentations that (i) is configured for the one or more properties of the device and (ii) is associated with the one or more presentation parameters for the three-dimensional model; and
causing presentation of the augmented reality presentation comprises presenting, by the application executing on the device, data for the augmented reality presentation that (i) is configured for the one or more properties of the device and (ii) is associated with the one or more presentation parameters for the three-dimensional model.

8. The computer storage medium of claim 7, the operations comprising:
generating, by the application for each of two or more graphics user interface components that relate to content depicted in the application, the graphics user interface component to cause presentation of the related content, wherein:
selecting the augmented reality presentation comprises selecting, by a first graphics user interface component from the two or more graphics user interface components, the augmented reality presentation from the plurality of augmented reality presentations that (i) is configured for the one or more properties of the device and (ii) is associated with the one or more presentation parameters for the three-dimensional model; and
determining, by the application, to skip analysis of the plurality of augmented reality presentations by a second graphics user interface component from the two or more graphics user interface components.

9. The computer storage medium of claim 1, wherein accessing the augmented reality data comprises accessing augmented reality data that is independent of an underlying operating system of the device.

10. The computer storage medium of claim 1, wherein accessing the presentation parameters for the three-dimensional model comprises:
  parsing the uniform resource identifier; and
  detecting one or more augmented reality presentation parameters in the parsed uniform resource identifier.

11. The computer storage medium of claim 1, wherein:
accessing the augmented reality data comprises accessing augmented reality data that includes augmented reality information for the plurality of augmented reality presentations that each depict the same object; and
selecting the augmented reality presentation comprises selecting the augmented reality presentation from the plurality of augmented reality presentations that each depict the same object using the one or more properties of the device.

12. The computer storage medium of claim 1, wherein the three-dimensional model comprises a three-dimensional model of an object.

13. The computer storage medium of claim 12, wherein the presentation parameters include a presentation angle parameter for specifying an initial presentation angle of the three-dimensional model of the object.

14. The computer storage medium of claim 12, wherein the presentation parameters include a color parameter for specifying an initial presentation color of the three-dimensional model of the object.

15. The computer storage medium of claim 12, wherein the presentation parameters include a size parameter for specifying an initial presentation size of the three-dimensional model of the object.

16. The computer storage medium of claim 1, wherein:
the content request includes data identifying a user account, and
accessing the presentation parameters for the three-dimensional model comprises determining one or more augmented reality presentation parameters that were previously selected by a user associated with the user account.

17. A system comprising one or more computers and one or more storage devices on which are stored instructions that are operable, when executed by the one or more computers, to cause the one or more computers to perform operations comprising:

accessing, for presentation of an augmented reality experience using an application executing on a device, augmented reality data for a plurality of augmented reality presentations of a three-dimensional model, the augmented reality data being identified by a uniform resource identifier included in a content request sent to a content system;

accessing presentation parameters for the three-dimensional model;

determining one or more properties of the device on which the application that will present the augmented reality experience is executing;

selecting an augmented reality presentation from the plurality of augmented reality presentations that (i) is configured for the one or more properties of the device and (ii) is associated with the one or more presentation parameters for the three-dimensional model; and causing presentation, by the application, of the augmented reality presentation that (i) is configured for the one or more properties of the device and (ii) is associated with the one or more presentation parameters for the three-dimensional model.

18. The system of claim 17, wherein:

determining the one or more properties of the device comprises determining an operating system of the device; and selecting the augmented reality presentation from the plurality of augmented reality presentations comprises selecting, using the operating system of the device, the augmented reality presentation from the plurality of augmented reality presentations that is configured for the operating system of the device and determining to skip selection of the second augmented reality presentation from the plurality of augmented reality presentations that is not configured for the operating system of the device.

19. The system of claim 17, wherein:

determining the one or more properties of the device comprises determining a model of the device; and selecting the augmented reality presentation from the plurality of augmented reality presentations comprises selecting, using the model of the device, the augmented reality presentation from the plurality of augmented reality presentations that is configured for the model of the device and determining to skip selection of the second augmented reality presentation from the plurality of augmented reality presentations that is not configured for the model of the device.

20. A computer-implemented method comprising:

accessing, for presentation of an augmented reality experience using an application executing on a device, augmented reality data for a plurality of augmented reality presentations of a three-dimensional model, the augmented reality data being identified by a uniform resource identifier included in a content request sent to a content system;

accessing presentation parameters for the three-dimensional model;

determining one or more properties of the device on which the application that will present the augmented reality experience is executing;

selecting an augmented reality presentation from the plurality of augmented reality presentations that (i) is configured for the one or more properties of the device and (ii) is associated with the one or more presentation parameters for the three-dimensional model; and causing presentation, by the application, of the augmented reality presentation that (i) is configured for the one or more properties of the device and (ii) is associated with the one or more presentation parameters for the three-dimensional model.

\* \* \* \* \*